United States Patent
Lundby et al.

(10) Patent No.: US 6,560,292 B1
(45) Date of Patent: May 6, 2003

(54) METHOD FOR CODING IN A TELECOMMUNICATIONS SYSTEM

(75) Inventors: Stein Lundby, San Diego, CA (US); Keith Saints, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/547,824

(22) Filed: Apr. 7, 2000

(51) Int. Cl.⁷ .............................................. H04L 27/00
(52) U.S. Cl. ...................................... 375/259; 375/299
(58) Field of Search ................................ 375/256, 259, 375/260, 267, 347, 349, 285, 224, 296, 299; 455/522, 59, 101, 103, 115; 370/248, 437

(56) References Cited

U.S. PATENT DOCUMENTS 5,978,365 A  11/1999 Yi .............................. 370/331
6,185,258 B1 * 2/2001 Alamouti et al. ........... 375/260

OTHER PUBLICATIONS

Byung K. Yi, "The Softest Handoff Design Using Iterative Decoding (Turbo Code)," LGIC, Vancouver, Jan. 12, 2000. (pp. 1–30 and Title page).
Byung K. Yi, et al. "The Softest Handoff Design Using Iterative Decoding (Turbo Code)," LGIC, Vancouver, Jan. 12, 2000. (pp. 1–30 and Title page).
Byung K. Yi, "The Novel Soft Handoff for 3GPP2 Using Code Combining, Packet Combining and Turbo Coding," LG Information & Communications, Jan. 11, 2000. (pp. 1–37 and Title page).

* cited by examiner

*Primary Examiner*—Jean Corrielus
(74) *Attorney, Agent, or Firm*—Philip R. Wadsworth; Charles D. Brown; Kyong H. Macek

(57) ABSTRACT

A method is taught for improving the transmission of information signals in a communications system having a base station and a remote station. First and second transmission links are established with the remote station. An information signal is encoded to provide an encoded information signal having more bits than the information signal. First and second transmission signals are provided wherein each transmission signal has bits selected from the encoded information signal. Each of the first and second transmission signals is transmitted to the remote station by way of a respective one of the first and second transmission links. The remote station receives and combines the first and second transmission signals transmitted by the remote station to provide a combined encoded signal. The combined encoded signal is decoded by the remote station to provide the information signal. The first and second transmission links can be formed between the remote station and a single base station or between the remote station and two separate base stations.

13 Claims, 9 Drawing Sheets

METHOD FOR CODING IN A TELECOMMUNICATIONS SYSTEM

BACKGROUND OF THE INVENTION

I. Field of the Invention

The present invention relates to communications in general and, in particular, to improving the transmission of information signals in a communications system.

II. Description of the Related Art

The quality of a communication link over a noisy channel depends on the energy to interference noise ratio Eb/No of the signal. To achieve a required bit error rate over the communication link, a particular Eb/No is required. The bit error rate is a function of several parameters including channel propagation characteristics. In order to reach the target Eb/No a transmitter must transmit a signal with sufficient power. In practice, communication systems of this type are power limited. In power limited systems the transmitter cannot necessarily transmit the amount of power required to maintain a desired bit error rate. In CDMA systems, the sum of the power required by each link in the system determines the overall capacity of the system. Thus, it is desirable for each communication link to require the lowest Eb/No possible.

In order to decrease the required Eb/No in CDMA systems, the data to be transmitted can be encoded. Many different encoders are known in the art. For example, conventional convolutional and turbo encoders are suitable for this purpose. All of the suitable encoders perform the same basic task of creating redundancy in the encoded information signal. In such encoding techniques, each encoded bit is a function of a plurality of input bits.

For example, the encoder system 1 of FIG. 1 can be used to provide a redundant encoded signal suitable for use in decreasing the required Eb/No in a CDMA communication system. The rate R encoder 4 of the encoder system 1 receives a stream of k information bits 2 and outputs a larger stream 6 of n coded bits wherein R is the code rate. The code rate R is the ratio of the number of information bits k per unit of time to the number of coded bits n per unit of time. Thus R=k/n, and n=k/R. The n bits of coded bit stream 6 at the output of the rate R encoder 4 can be transmitted over the transmission channel 8. A rate R decoder 12 performs a decoding operation that is the inverse of the operation performed by the rate R encoder 4. That is, the rate R decoder 12 converts the received n coded bits 10 into k information bits 14 that are substantially equivalent to the k information bits 2 that were input to the rate R encoder 4. In CDMA systems, typically the rate R=½ or R=⅓.

It is known that for similar encoding techniques a lower code rate R permits a lower Eb/No to obtain the same bit error rate (where it is understood that ⅓ is a "lower" rate than ½). However, this improvement in performance becomes negligible when the code rate R becomes too low. Typically little further improvement occurs below R=⅙. Furthermore, since the number of encoded bits increases as the code rate R gets smaller it is usually not desirable or even possible to transmit the large number of coded bits required for code rates lower than R ⅙. Typically, code rates of ½ and ⅓ are preferred.

Although the use of a lower code rate is desirable, because it would lower the required Eb/No in a CDMA communication system, it is deemed undesirable to use a lower code rate if doing so would have an overall adverse effect, such as lowering system capacity.

Lower code rates generate more bits for transmission than do higher code rates. For example, if the code rate on a system were decreased from ½ to ¼, it would double the number of coded bits needed to be transmitted by the system. Thus, bandwidth between the remote station and the base station would need to be doubled in order to support such a decrease in code rates.

In a CDMA system, one could double the effective bandwidth on the forward link by halving the length of the Walsh codes used for orthogonally spreading the encoded bit stream. For example, by halving the length of the Walsh codes used in a CDMA system from 64 bits to 32 bits, a given data stream could be transmitted over the forward link in half the number of coded bits. Although decreasing the Walsh code length effectively increases the bandwidth between the remote station and the base station, it is undesirable to decrease the Walsh code length because doing so decreases the pool of Walsh codes. As is well known in the art, a decreased pool of Walsh codes decreases the number of users that the system can support. When a system has allocated all of its Walsh codes to users, no more users can be added to the system because the system is said to be "code limited".

Since the number of spreading codes in a system is limited, the advantages of any gain achieved with a low code rate R can be offset by the disadvantage of the use of additional spreading codes. Thus, although decreasing the code rate R used by each user in a CDMA communication system improves the required Eb/No per user, it can also limit the number of users by creating a shortage of spreading codes. Although there exists ways of creating more spreading codes, such as by using quasi-orthogonal functions or by using multiple scrambling (PN) codes, these techniques are used as a last resort because they significantly increase the overall interference level in the system.

Besides being code limited, a system may be limited in the number of users it can support at a given time due to limits in the amount of power that the base station can transmit. Transmitting more power than is allowed will cause interference that cannot be tolerated by the adjacent cells. When a new user is added to the system, the amount of power that is transmitted by the base station will increase. Because there is a limit on the amount of power that the base station can transmit, the number of users may be limited by the total amount of power that can be transmitted. Therefore, even if there are additional spreading codes available, the number of users will be limited by the amount of power that can be transmitted by the base station. When a base station is limited in the number of users it can support at a given time due to power transmission limitations, the system is said to be "power limited".

To improve the performance of a telecommunication system—performance which is usually measured in Erlangs, bits per seconds, or number of users—it is necessary to take into account both code limitations and power limitations. What is desired is a way to increase the system performance of a telecommunications system, often measured in the number of users that a telecommunications system can simultaneously support, by taking into account the fact that the system is both code limited and power limited.

SUMMARY OF THE INVENTION

A method is taught for improving the transmission of information signals in a communications system having a base station and a remote station. First and second transmission links are established with the remote station. A base station information signal is encoded to provide an encoded information signal having more bits than the information signal. First and second transmission signals are provided wherein each transmission signal has bits selected from the encoded information signal. The first and second transmission signals are each transmitted to the remote station by one of the first and second transmission links, respectively. The remote station receives and combines the first and second transmission signals transmitted by the remote station to provide a combined encoded signal. The combined encoded signal is decoded by the remote station to provide the information signal. The first and second transmission links can be formed between the remote station and a single base station or between the remote station and two separate base stations.

BRIEF DESCRIPTION OF THE DRAWINGS

The features, objects, and advantages of the present invention will become more apparent form the detailed description set forth below when taken in conjunction with the drawings in which like reference characters identify corresponding elements throughout and wherein.

DETAILED DESCRIPTION OF THE INVENTION

Figure 1:
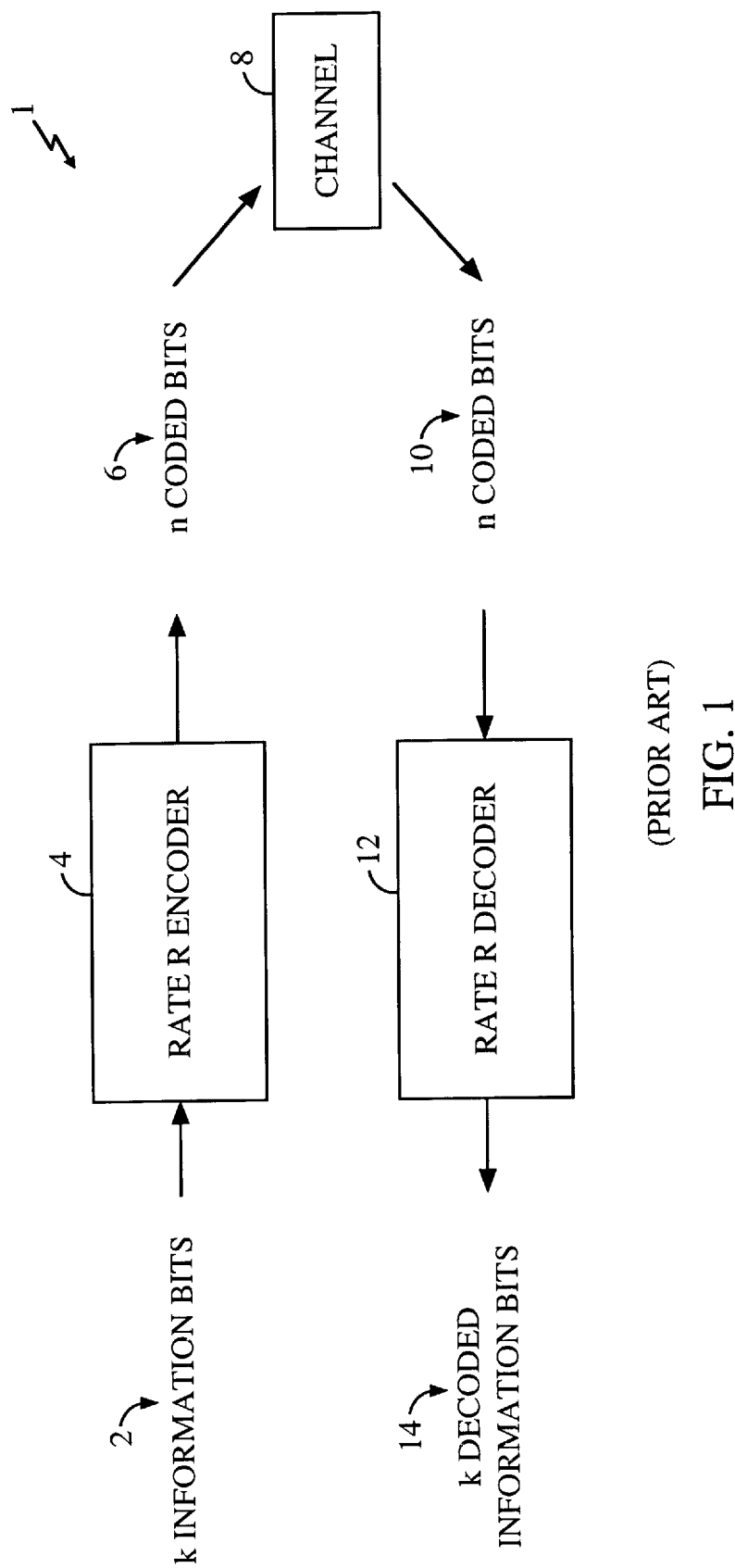
FIG. 1 shows a conventional information bit stream encoder system suitable for encoding signals in a wireless communications system.
Figure 2:
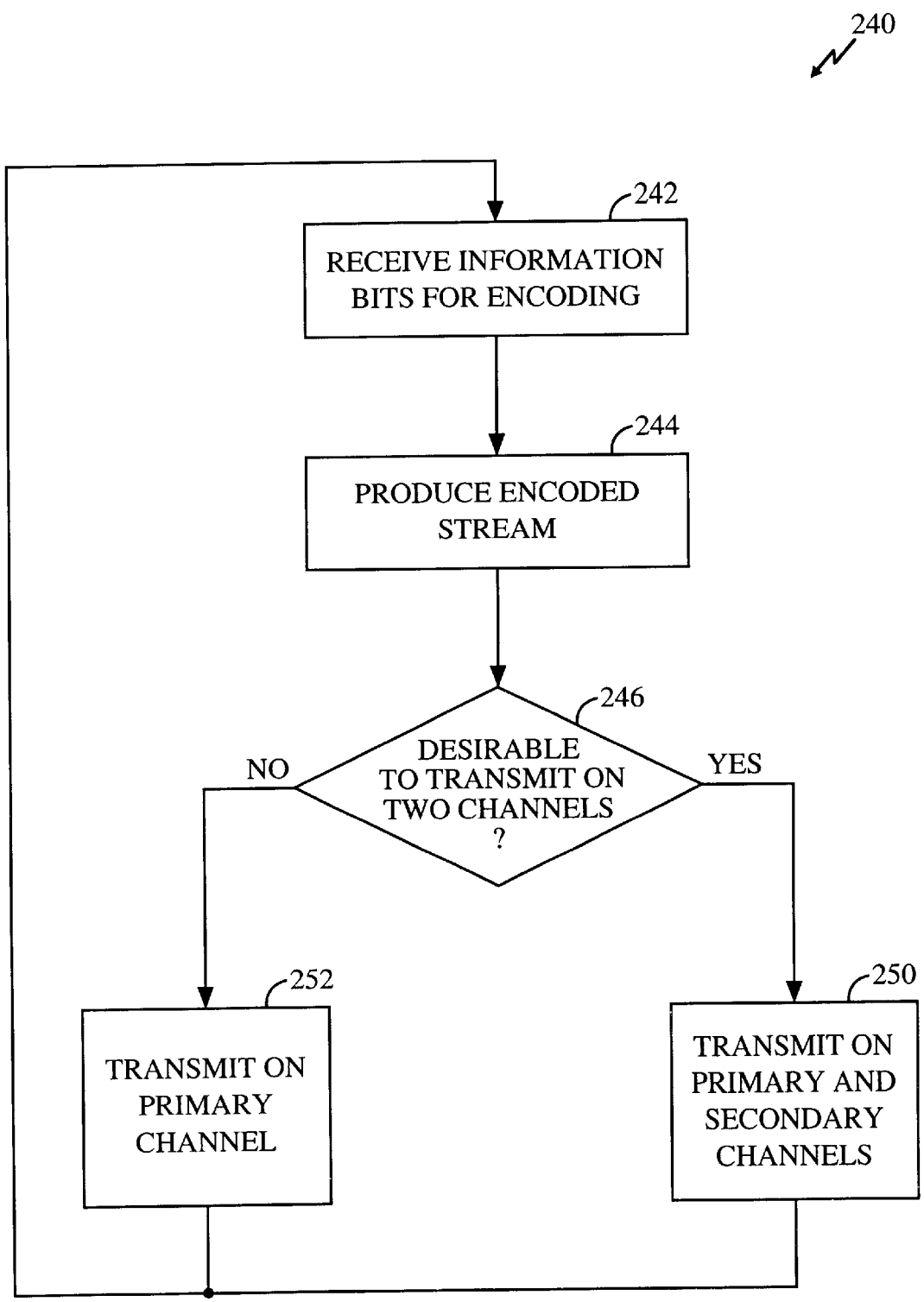
FIG. 2 shows a block diagram representation of a method for transmitting information in a wireless communications system.

FIG. 2 is a block diagram of a signal transmission method 240 in accordance with one embodiment of the present invention . In signal transmission method 240, a base station information bit stream to be transmitted to a remote station is received for encoding in block 242. The process then moves to block 244.

In block 244 the information bit stream is encoded into a lower rate encoded bit stream to decrease the required Eb/No needed to transmit the bits to a remote station (as mentioned earlier, a lower code rate generates more bits than a higher coderate but requires less transmit power to achieve the same quality of service). In an exemplary embodiment, the encoder is a rate ¼ turbo encoder. In alternate embodiments, various encoder rates and types can be used. In an exemplary embodiment, the encoder has a property such that the odd bits of the ¼ rate encoded bit stream make up a ½ rate encoded bit stream, and the even bits make up a second ½ rate encoded bit stream. In other words, bits 1, 3, 5, etc. make up one ½ rate encoded bit stream and bits 2,4,6, etc make up a separate ½ rate encoded bit stream. All of the bits, however, comprise the ¼ rate encoded bit stream. In the aforementioned embodiment, the ¼ rate encoded bit stream is the lower rate encoded bit stream referenced earlier. In alternate embodiments the bits are arranged such that a different combination of the bits makes up the two ½ rate streams (e.g., the first n/2 bits comprise one ½ rate encoded bit stream, while the second n/2 bits comprise a second ½ rate encoded bit stream). In the above exemplary embodiments, the fact that the lower rate encoded bit stream comprises at least one standard bit encoded bit stream allows the encoder to produce only a single bit stream that could be used for transmission on two channels as later described in reference to block 250 and which also could have a portion of it used for transmission on a single channel in block 252. In yet another alternate embodiment, the encoder produces two separate bit streams, one encoded at a lower rate and one encoded at a standard rate (e.g., ¼ rate and ½ rate, respectively). In this alternate embodiment, the lower rate encoded bit stream need not be comprise two standard rate encoded bit streams. In this embodiment, the lower rate encoded bit stream would be used for transmission when the process branches to block 250 and the separate standard rate encoded bit stream would be used for transmission when the process branches to block 252.

The process then moves from block 244 to decision block 246. Block 246 is representative of a decision block wherein it is determined whether a single standard rate encoded bit stream should be transmitted on a single channel or whether a lower rate encoded bit stream should be transmitted in portions over two channels. Any parameter(s) within a CDMA communication system can be used as the basis of the decision in decision block 246. The only criterion for selecting a parameter for use in decision block 246 is whether the parameter can be used to optimize the communication system in some way. Thus, the quality determination made in decision block 246 can be made based on any one of a large number of different quality factors. A straightforward way to make the decision is to have the transmitter recognize that it is transmitting at a high power level (for example, recognizing that more than 10% of the base station's transmit power capacity is being used on any given remote station), and that it should switch from one transmit stream to two transmit streams.

In one embodiment, in block 246, it is determined whether the amount of transmit power that would be utilized to transmit the data as a single standard rate encoded bit stream is above a predetermined threshold. The power level of the transmission is increased as necessary in order to maintain a desired bit error rate, but the power level can not be increased without limit. Thus, in decision block 246 a determination is made as to whether "excessive" transmission power is required to maintain the bit error rate. If the transmission power is deemed "excessive," then the process proceeds to block 250, wherein the lower rate encoded bit stream is transmitted on two channels.

In one embodiment, in decision block 246 it is also checked whether the number of spreading codes presently available is above a pre-determined first threshold value. In such a case, not only must "excessive" power be determined, but also the number of available spreading codes must be above the first threshold value in order for the process to move to block 250. The first threshold value is zero in one embodiment, meaning that there must be at least one available spreading code. This check is done because, although it is desirable to reduce power by transmitting data over two channels, a code needs to be available to allocate to the secondary channel.

In one embodiment, it is determined in decision block 246 whether the remote station is in soft-handoff or in softer-handoff. As is known in the art, when a remote station is in soft-handoff or softer-handoff, a remote station has communication channels open with more than one cell site sector. Hereinafter, soft-handoff shall be used to refer to both soft-handoff and softer-handoff. If it is determined that a remote station is in soft-handoff, then the process moves to block 250. The reason the process moves to block 250 is as follows. In a conventional system, each sector would transmit the same standard encoded bit stream using one channel (Walsh code) per sector. Using the method of the present embodiment uses no extra channels in this instance, because only two channels are needed, and they would have been used in the conventional system during soft-handoff anyway. Proceeding to block 250 thus does not use any extra channels, yet it yields the gain described in reference to block 250 below. Namely, less power can be used when transmitting a lower encoded rate bit stream than when transmitting a standard encoded rate bit stream. This relationship holds true even when the same standard encoded bit stream is transmitted on multiple channels, as it is in a conventional system while a remote station is in soft-handoff. Thus, due to the increased system performance from the power savings that can be obtained, the process moves to block 250 when the remote station is in soft-handoff.

In one embodiment a pre-determined second threshold value can be used in block 246 to determine whether or not to move to block 250 irrespective of whether or not it is determined that "excessive" power is being used to transmit to the remote station. In such a case, if the number of available spreading codes is above the second threshold value, thus indicating that using an extra code for the call in question would likely not cause a shortage of codes that would reduce system capacity, then the process would proceed to block 250, irrespective of whether the amount of power being used to transmit to the remote station is excessive. In this case, although the transmitter's power might not be excessive, reducing the transmitter's power by any amount will still benefit the wireless system because it reduces the likelihood of interfering with other cells. Because there is presently no shortage of spreading codes, and the likelihood is low that there will be a shortage of spreading codes anytime soon (as determined by comparing the number of available codes with a second threshold value), it is beneficial to use one of the spreading codes to reduce transmit power, thus increasing system performance.

One skilled in the art will appreciate that decision block 246 can use any combination of the above embodiments, or it can use any other embodiments that can determine whether transmitting data to a particular remote station across two channels will optimize the communication system, to decide whether or not to proceed to block 250 in which the lower rate encoded bit stream is transmitted on two channels. One simple embodiment that can be used in decision block 246 is to check the setting of a flag, variable, or register, to determine whether or not the communication system will benefit from transmitting data to a particular remote station across two channels. This is useful in a communication system wherein a complex determination is first made that two channels should be used for transmission, after which a single indicator bit, or a message containing multiple bits, both of which are hereinafter referred to as an indicator message, is sent to the remote station to indicate that a lower rate encoded bit stream will be transmitted on two channels at a predetermined point in time in the future. A flag is then set in the telecommunication system to indicate that future bit streams should be transmitted across two channels at a predetermined point in time. In such a case, just a flag would need to be checked in block 246.

If, in block 246, it is determined that the communication system will benefit from transmitting data to a particular remote station across two channels, the process proceeds to block 250. Otherwise, the process proceeds to block 252.

In block 250, the telecommunications system uses a mode of communication with the base station such that a first portion of the lower rate encoded bit stream is transmitted on a primary channel, while a second portion is transmitted on a secondary channel. In one embodiment, the two separate standard rate encoded bit streams that make up the lower rate encoded bit stream are transmitted over a primary and secondary channel. For example, if the lower rate encoded bit stream is a ¼ rate bit stream comprising both a standard ½ rate encoded bit stream in its odd bits and a standard ½ rate encoded bit stream in its even bits, then the odd bits of the stream would be transmitted over a primary channel and the even bits would be transmitted over a secondary channel. In the aforementioned embodiment the portions transmitted are of equal length. However, the present invention is not limited to such an embodiment. In alternate embodiments, portions of varying length can be transmitted on multiple channels. For instance, an encoded bit stream could have one third of its bits transmitted on a primary channel and the remaining two thirds of its bits transmitted on a secondary channel.

The use of two channels rather than one results in a higher gain within the communication system. The second transmission channel can be established when needed or it can already be in use.

After the encoded bit streams are formed for each channel, each bit stream is transmitted in accordance with traffic channel requirements for the specific system at hand. For example, as is known to one skilled in the art, in a cdma2000 system the forward link channel's encoded bit stream is interleaved, covered with a Walsh code, spread with a PN sequence, and digitally modulated using Quadrature Phase Shift Keying (QPSK). It will be understood that performing signal transmission in this manner requires a base station to use two Walsh codes rather than one, because two channels are being used instead of one. Furthermore, it will be understood that when performing signal transmission is this manner, the transmit power of each of the transmission channels of block 250 can be less than one half the transmit power needed to maintain a desired bit error rate had only a single channel been used. Thus, the peak power requirement for transmitting the encoded information signal is reduced by more than one half.

When transmitting data in this mode, the communication system needs to indicate to the remote station that it needs to begin receiving bit streams at a lower code rate, wherein the bit stream are transmitted in portions amongst multiple channels. As stated in relation to block 246, this indication can be transmitted as an indicator message prior to the point in time at which data transmissions in this mode begin. Or, alternatively, one or more indicator bits can be transmitted at substantially the same time as that in which the bit streams are transmitted in block 250. For instance, there could be a separate channel that the mobile monitors just before, or at the beginning of the reception of a bit stream to determine whether to receive the bit stream across two channels. This would be of value in a telecommunications system in which several remote stations share a dedicated secondary Walsh code, and wherein a given remote station can begin decoding a second channel with that dedicated Walsh code shortly after receiving an indicator bit instructing it to do so.

The process then returns to block 242.

Returning to block 246, if it is determined that the communication system will not benefit from transmitting data to a particular remote station across two channels, the process proceeds to block 252. In block 252, a standard rate encoded bit stream is transmitted over a primary channel. In one embodiment, one in which the encoder produces a single lower rate encoded bit stream, the standard rate encoded bit stream to be transmitted is extracted from the lower rate encoded bit stream. For example, the odd bits could be extracted to form the standard rate encoded bit stream. In an alternate embodiment, one in which the encoder produces both a lower rate encoded bit stream and a standard rate encoded bit stream, no extraction of bits is necessary. In such an embodiment, the standard rate encoded bit stream is simply transmitted on a primary channel. The process then returns to block 242.

One skilled in the art will appreciate that in alternate embodiments the blocks need not be in the order they appear in FIG. 2. For instance, one skilled in the art will appreciate that in one alternate embodiment, block 244 and block 246 could be reversed, such that the decision of whether to transmit a lower rate encoded bit stream is made prior to the generation of the encoded bit stream. One embodiment in which the decision of whether to transmit a lower rate encoded bit stream is made prior to the generation of the encoded bit stream is shown in FIG. 5.

Figure 5:
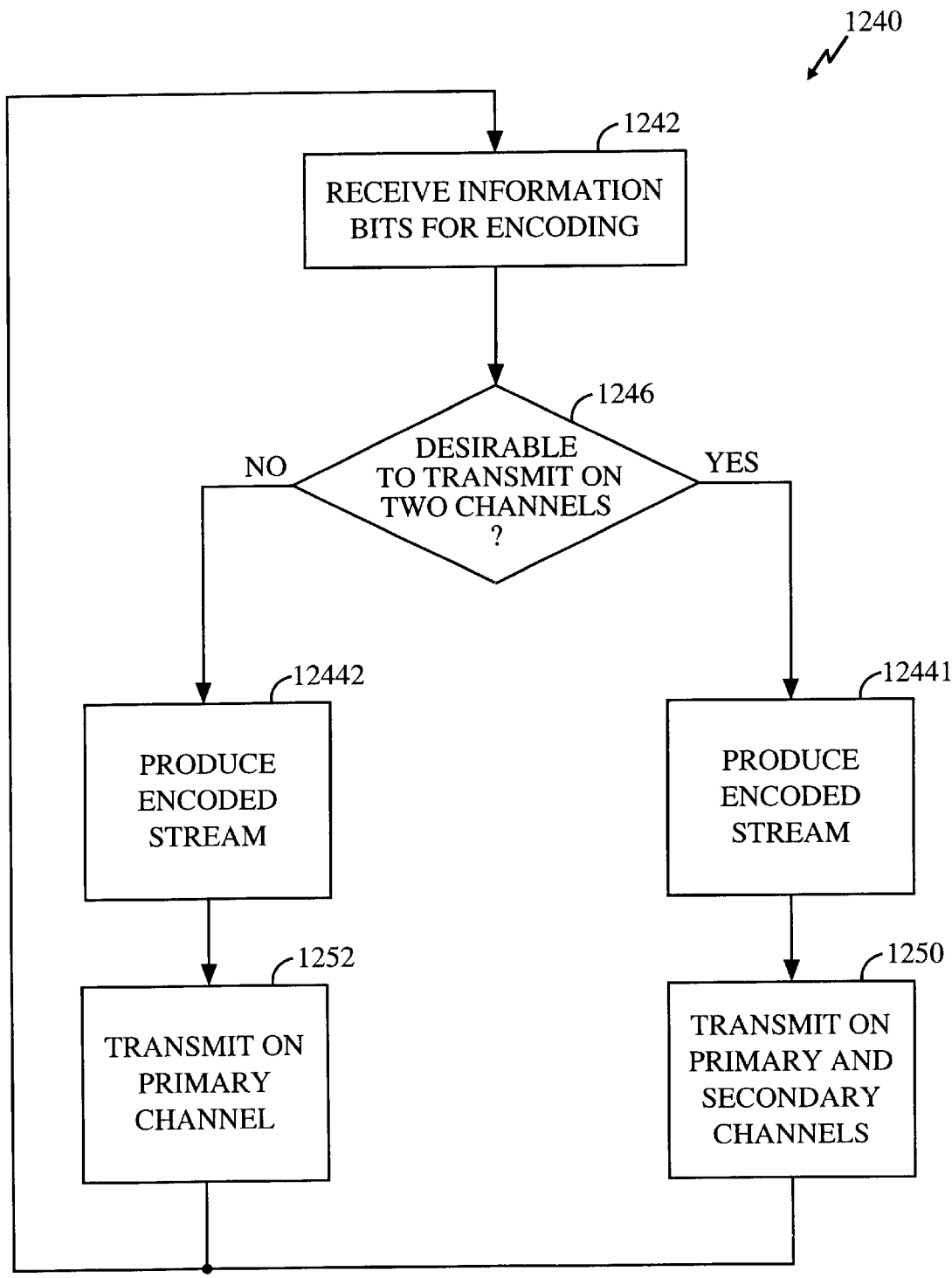
FIG. 5 shows an alternative block diagram representation of a method for transmitting information in a wireless communications system.

FIG. 5 is an alternative block diagram of a signal transmission method 1240 in accordance with one embodiment of the present invention. In signal transmission method 1240, a base station information bit stream to be transmitted to a remote station is received for encoding in block 1242.

The process then moves from block 1242 to block 1246. Block 1246 is representative of a decision block wherein it is determined whether a single standard rate encoded bit stream should be transmitted on a single channel or whether a lower rate encoded bit stream should be transmitted in portions over two channels. Any parameter(s) within a CDMA communication system can be used as the basis of the decision in decision block 1246. The only criterion for selecting a parameter for use in decision block 1246 is whether the parameter can be used to optimize the communication system in some way. Thus, the quality determination made in decision block 1246 can be made based on any one of a large number of different quality factors. A straightforward way to make the decision is to have the transmitter recognize that it is transmitting at a high power level, and that it should switch from one transmit stream to two transmit streams.

In one embodiment, in block 1246, it is determined whether the amount of transmit power that would be utilized to transmit the data as a single standard rate encoded bit stream is above a predetermined threshold. The power level of the transmission is increased as necessary in order to maintain a desired bit error rate, but the power level can not be increased without limit. Thus, in decision block 1246 a determination is made as to whether "excessive"transmission power is required to maintain the bit error rate. If the transmission power is deemed "excessive," then the process proceeds to block 12441 wherein a lower rate encoded bit stream is generated, and subsequently transmitted on two channels in block 1250. This occurs because a base station that is transmitting signals to a remote station at an excessively high power level can significantly lower its transmit power level by transmitting the signal at a lower code rate over two channels. Due to the significant decrease in transmit power achieved, system capacity is likely greater in this case, even with the loss of a Walsh code, than if the transmit power to this remote station remained excessive and the walsh code had been saved.

In one embodiment, in decision block 1246, it is also checked whether the number of spreading codes presently available is above a pre-determined first threshold value. In such a case, not only must "excessive" power be determined, but also the number of available spreading codes must be above the first threshold value in order for the process to move to block 12441. The first threshold value is zero in one embodiment, meaning that there must be at least one available spreading code. This check is done because, although it is desirable to reduce power by transmitting data over two channels, a code needs to be available to allocate to the secondary channel.

In one embodiment, in decision block 1246, it is determined whether the remote station is in soft-handoff or in softer-handoff. As is known in the art, when a remote station is in soft-handoff or softer-handoff, a remote station has communication channels open with more than one cell site sector. Hereinafter, soft-handoff shall be used to refer to both soft-handoff and softer-handoff. If it is determined that a remote station is in soft-handoff, then the process moves to block 12441 wherein the lower rate encoded bit stream is generated, and subsequently transmitted in block 1250, as described below. The reason the process moves to block 12441 is as follows. In a conventional system each sector would transmit the same standard encoded bit stream using one channel (Walsh code) per sector. Using the method of the present embodiment uses no extra channels in this instance, because only two channels are needed, and they would have been used in the conventional system during soft-handoff anyway. Proceeding to block 12441, and subsequently to block 1250, thus does not use any extra channels (Walsh codes), yet it yields the gain described in reference to blocks 12441 and 1250. Namely, less power can be used when transmitting a lower encoded rate bit stream than when transmitting a standard encoded rate bit stream. This relationship holds true even when the same standard encoded bit stream is transmitted on multiple channels, as it is in a conventional system while a remote station is in soft-handoff. Thus, due to the increased system performance from the power savings that can be obtained, the process moves to block 12441, and subsequently to block 1250, when the remote station is in soft-handoff.

In one embodiment a pre-determined second threshold value can be used in block 1246 to determine whether or not to move to block 12441 irrespective of whether or not it is determined that "excessive" power is being used to transmit to the remote station. In such a case, if the number of available spreading codes is above the second threshold value, thus indicating that using an extra code for the call in question would likely not cause a shortage of codes that would reduce system capacity, then the process would proceed to block 12441, irrespective of whether the amount of power being used to transmit to the remote station is excessive. In this case, although the transmitter's power might not be excessive, reducing the transmitter's power by any amount will still benefit the wireless system because it reduces the likelihood of interfering with other cells. Because there is presently no shortage of spreading codes, and the likelihood is low that there will be a shortage of spreading codes anytime soon (as determined by comparing the number of available codes with a second threshold value), it is beneficial to use one of the spreading codes to reduce transmit power, thus increasing system performance.

One skilled in the art will appreciate that decision block 1246 can use any combination of the above embodiments, or it can use any other embodiments that can determine whether transmitting data to a particular remote station across two channels will optimize the communication system, to decide whether or not to proceed to block 12441 in which the lower rate encoded bit stream is transmitted on two channels. One simple embodiment that can be used in decision block 1246 is to check the setting of a flag, variable, or register, to determine whether or not the communication system will benefit from transmitting data to a particular remote station across two channels. This is useful in a communication system wherein a complex determination is first made that two channels should be used for transmission, after which after which an indicator message is sent to the remote station to indicate that a lower rate encoded bit stream will be transmitted on two channels at a predetermined point in time in the future. A flag is then set in the telecommunication system to indicate that future bit streams should be transmitted across two channels at a predetermined point in time. In such a case, just a flag would need to be checked in block 1246.

If, in block 1246, it is determined that the communication system will benefit from transmitting data to a particular remote station across two channels, the process proceeds to block 12441. Otherwise, the process proceeds to block 12442.

In block 12441 the information bit stream is encoded into a lower rate encoded bit stream to decrease the required Eb/No needed to transmit the bits to a remote station (as mentioned earlier, a lower code rate generates more bits than a higher code rate). In an exemplary embodiment, the encoder is a rate ¼ turbo encoder. However, it should be noted that various encoder rates and types can be used. In an exemplary embodiment, the encoder has a property such that the odd bits of the ¼ rate encoded bit stream make up a ½ rate encoded bit stream, and the even bits make up a second ½ rate encoded bit stream. In other words, bits 1, 3, 5, etc. make up one ½ rate encoded bit stream and bits 2,4,6, etc make up a separate ½ rate encoded bit stream. All of the bits, however, comprise the ¼ rate encoded bit stream. In the aforementioned embodiment, the ¼ rate encoded bit stream is the lower rate encoded bit stream referenced earlier. In alternate embodiments the bits are arranged such that a different combination of the bits makes up the two ½ rate streams (e.g., the first n/2 bits comprise one ½ rate encoded bit stream, while the second n/2 bits comprise a second ½ rate encoded bit stream). In alternate embodiments the lower rate encoded bit stream is not comprised of two standard rate encoded bit streams.

The process then moves to block 1250.

In block 1250, a first portion of the lower rate encoded bit stream is transmitted on a primary channel, while a second portion is transmitted on a secondary channel. In one embodiment, the two separate standard rate encoded bit streams that make up the lower rate encoded bit stream are transmitted over a primary and secondary channel. For example, if the lower rate encoded bit stream is a ¼ rate bit stream comprising both a standard ½ rate encoded bit stream in its odd bits and a standard ½ rate encoded bit stream in its even bits, then the odd bits of the stream would be transmitted over a primary channel and the even bits would be transmitted over a secondary channel. In the aforementioned embodiment the portions transmitted are of equal length. However, the present invention is not limited to such an embodiment. In alternate embodiments, portions of varying length can be transmitted on multiple channels. For instance, an encoded bit stream could have one third of its bits transmitted on a primary channel and the remaining two thirds of its bits transmitted on a secondary channel.

The use of two channels rather than one results in a higher gain within the communication system. The second transmission channel can be established when needed or it can already be in use. Additionally, more than one remote station operating according to transmission method 1240 can share a secondary channel.

It will be understood that performing signal transmission in this manner requires a base station to use two Walsh codes rather than one. Furthermore, it will be understood that when performing signal transmission is this manner, the transmit power of each of the transmission channels of block 1250 can be less than one half the transmit power needed to maintain a desired bit error rate had only a single channel been used. Thus, the peak power requirement for transmitting the encoded information signal is reduced by more than one half.

When transmitting data in this mode, the communication system needs to indicate to the remote station that it needs to begin receiving bit streams at a lower code rate, wherein the bit stream are transmitted in portions amongst multiple channels. As stated in relation to block 1246, this indication can be transmitted as an indicator message prior to the point in time at which data transmissions in this mode begin. Or, alternatively, one or more indicator bits can be transmitted at substantially the same time as that in which the bit streams are transmitted in block 1250. For instance, there could be a separate channel that the mobile monitors just before, or at the beginning of the reception of a bit stream to determine whether to receive the bit stream across two channels. This would be of value in a telecommunications system in which several remote stations share a dedicated secondary Walsh code, and wherein a given remote station can begin decoding a second channel with that dedicated Walsh code shortly after receiving an indicator bit instructing it to do so.

The process then returns to block 1242.

Returning to block 1246, if it is determined that the communication system will not benefit from transmitting data to a particular remote station across two channels, the process proceeds to block 12442. In block 12442, a standard rate encoded bit stream is generated. In one embodiment, only a standard rate encoded bit stream is generated in block 12442. In an alternate embodiment, a lower rate encoded bit stream is first generated, and then a standard rate encoded bit stream is extracted from bits of the lower rate encoded bit stream. The process then moves to block 1252, wherein the standard rate encoded bit stream is transmitted over a primary channel. The process then returns to block 1242.

Figure 3:
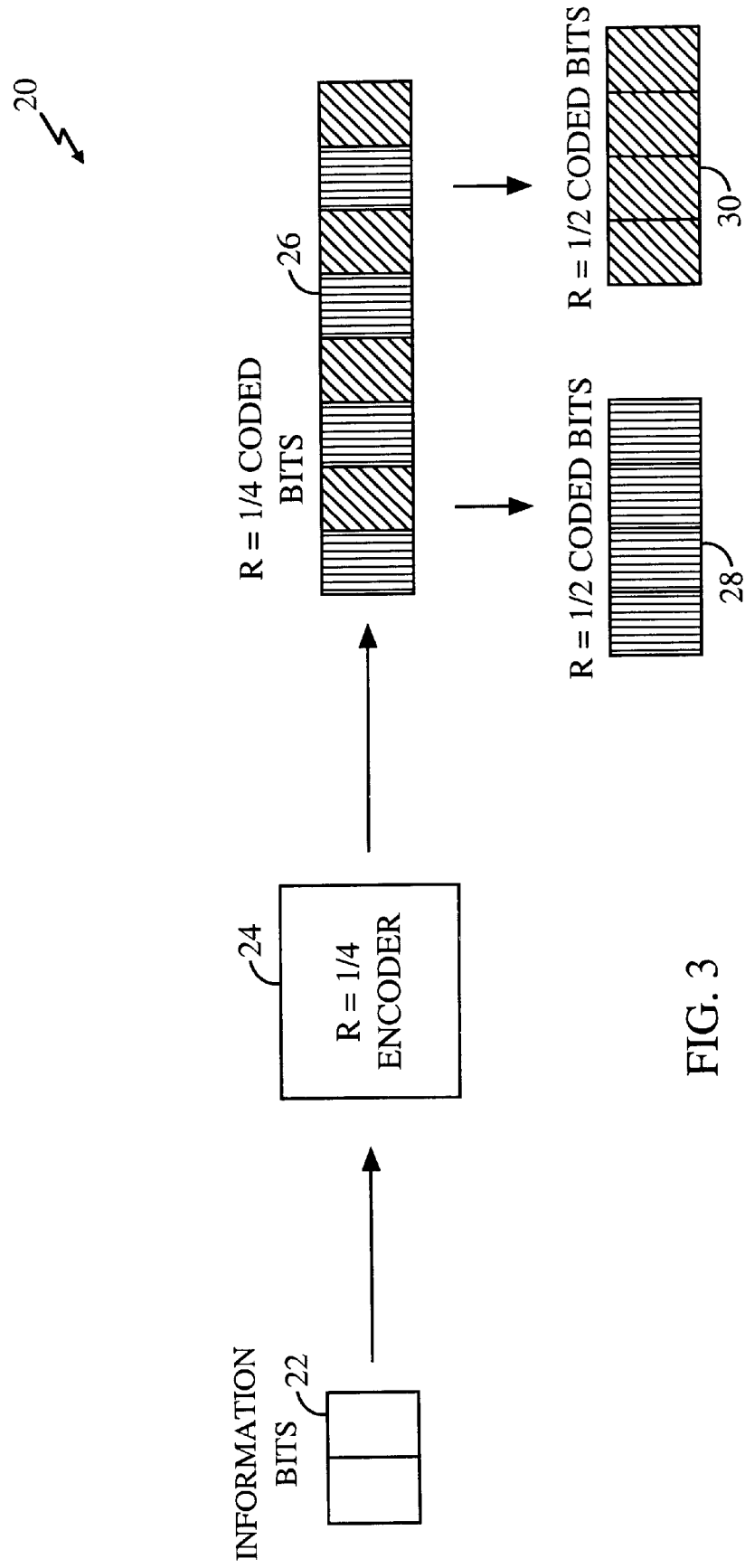
FIG. 3 shows a code generator system using puncturing of a lower code signal to provide a required signal.

FIG. 3 illustrates a code generator system 20. Encoder systems such as code generator system 20 can be used to generate a code having a required code rate R by extracting a portion of the output of a lower rate code. For example, in code generator system 20, two sets of ½ rate coded bit streams are provided by using a ¼ rate encoder 24. Information bits 22 of encoder system 20 are applied to ¼ rate encoder 24 to produce R=¼ coded bit stream 26. In an exemplary embodiment the odd bits of the output make up a ½ rate coded bit stream and the even bits make up a second ½ rate coded bit stream. Thus, when the portion of odd bits is extracted from R=¼ coded bit stream 26, a first R=½ coded bit stream 28 is generated. Likewise, when the portion of even bits is extracted from R=¼ coded bit stream 26, a second R=½ coded bit stream 30 is generated. Thus a code rate R=½ can be generated by extracting a predefined set of bits from the output of R=¼ rate encoder 24. A remote station receiving both R=½ coded bit stream 28 on a primary channel and R=½ coded bit stream 30 on a secondary channel can combine the bits together into their correct predefined positions and decode the full R=¼ coded bit stream 26. It is understood by one skilled in the art that in alternate embodiments encoder system 20 could comprise an encoder that encodes at a different code rate R and/or that generates a coded bit stream of higher code rates in patterns other than a 2R code rate bit stream located in the odd bits and a 2R code rate bit stream located in the even bits.

Thus code generator system 20 can be used to generate a lower rate encoded bit stream containing a first and second portion of bits, each of which comprises a first standard rate encoded bit stream and a second standard rate encoded bit stream, respectively. The first standard rate encoded bit stream and the second standard rate encoded bit stream can be transmitted to the remote station where they can be combined and decoded. Using this method of transmission permits all of the information of the unencoded information bit stream to be decoded by the remote station from a single one of the two encoded signals received on one of the two channels used for transmission. This permits the receiver to decode the signal even if one of the transmissions is not received. However, a decoding performed using only one of the encoded signals is less robust than a decoding performed using both encoded signals. Therefore, both encoded signals should be used if they are available.

Code combining methods suitable for use in combining the encoded streams are well known in the art. It is understood by one skilled in the art that if a remote station receives only a subset of the encoded streams provided in the generalized case it can still decode the information bits, with reduced decoding performance. It will be understood by one skilled in the art that encoders of other rates, R, can be used in other embodiments.

Figure 4:
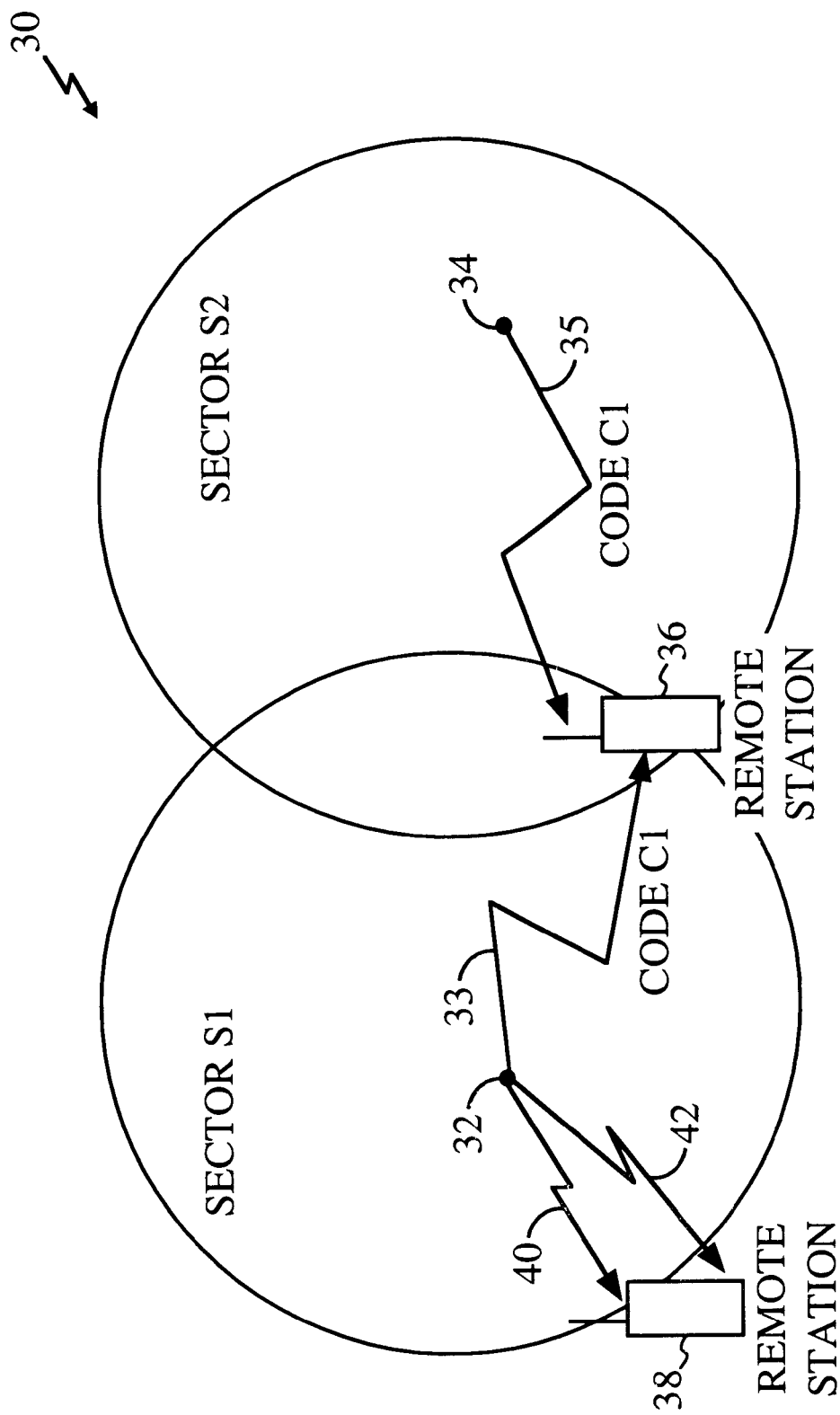
FIG. 4 shows a wireless communications system wherein the method of the present invention can be advantageously applied.

In FIG. 4, there is shown CDMA communication system 30. CDMA communication system 30 includes base stations 32, 34 located in adjacent sectors S1 and S2 and remote stations 36, 38. In CDMA communication system 30 remote stations 36, 38 suffer the worst transmission interference when they are at the edge of a cell. The major reason for this is that the propagation loss is largest when they are farthest from base stations 32, 34. Additionally, remote stations 36, 38 are closest to interfering cells at this point. It is therefore desirable to improve the decoding results when remote stations 36, 38 are at the edge of a cell.

Conventionally a communication link is established between remote stations 36, 38 and all nearby sectors. Remote stations 36, 38 receive the same coded bits from each of the nearby sectors and combine them in power, in a conventional system. This process is referred to as soft handoff for sectors belonging to different cells and softer handoff for sectors in the same cell. The method of the present embodiments can be advantageously applied to both soft and softer handoff.

In the method of the present embodiments, in the case of soft handoff each sector encodes the same information bits. However, the encoding is not necessarily performed with the same code. In the method of the present embodiments, remote station 36 can initiate a call when it is located well within an initial sector $S_1$. In this case, sector $S_1$ transmits the information bits encoded with a code $C_1$ of rate $R_1$ over communication link 33. Remote station 36 can then move to the boundary between the original sector $S_1$ and another sector $S_2$. In FIG. 4, remote station 36 is at the boundary between sector $S_1$ and another sector $S_2$. At this point, remote station 36 goes into soft handoff with the two sectors. In one embodiment of the invention, sector $S_2$ transmits the same information bits encoded with a code $C_2$ of rate $R_2$ over a communication link 35. If the $R_1$ and $R_2$ codes are chosen correctly, remote station 36 can combine the stream of coded bits from sector $S_1$ with the coded bits from sector $S_2$ in such a way that it obtains the equivalent of information bits coded with a code of rate $1/((1/R_1)+(1/R_2))$. For example, if code rate $R_1$=½ and code rate $R_2$=½, the remote station could combine the coded bit streams into a single coded bit stream of R=¼ in the method of the present embodiments.

Remote station 36 has to correctly combine the bits. In the example of a lower rate coding scheme wherein the odd bits make up a first standard rate encoded bit stream and the even bits make up a second standard rate encoded bit streams, the odd bits will be transmitted from one sector and the even bits will be transmitted from another sector. The remote station needs to know a priori which sector is transmitting the odd bits and which is transmitting the even bits so that it can properly assemble the standard rate encoded bit stream from the two lower rate encoded bit streams. In one embodiment of the invention, a handoff direction message, presently used to instruct a remote station to enter soft handoff with a particular sector, will contain one or more bits that indicate to the remote station how to combine the bits from each sector.

In one embodiment, a separate message of one or more bits in the handoff message (e.g., extended handoff direction message in cdma2000) informs the remote station how the bits from a particular channel on a particular sector should be combined with the bits from other channels on other sectors. For instance, if a system were to use the odd bit/even bit method of encoding, as described earlier, a base station could send a handoff redirection message to remote station 36 using one bit in that message to tell the remote station whether the bits from Sector S2 should be treated as the odd bits or the even bits in the stream, and using one bit telling the remote station how the bits from Sector S2 should be treated.

In another embodiment, the bits are ordered in a predetermined fashion in accordance with the base station identifiers associated with the channels of the communication with a remote station. For example, in one embodiment a system could be designed wherein when a remote station is in soft handoff, the odd bits of a lower rate encoded bit stream will be transmitted from the base station involved in the communication that has the lowest base station identifier, while the even bits of the lower rate encoded bit stream will be transmitted from the other base stations involved in the communication. For instance, if a remote station were in a soft-handoff with base stations having identifiers of B and C (not shown), base station B would transmit the odd bits of a lower rate encoded bit stream while base station C would transmit the even bits.

If the remote station subsequently goes into a three-way handoff, with base stations A, B, C (not shown), for example, then one of several embodiments could take place.

In one such embodiment, the portions are not dynamically assigned to the new/third base station, but instead a new base station always gets a fixed portion of bits to transmit. This works in a three-way handoff because the first two base stations are already transmitting all the bits in the lower rate encoded bit stream, and the third base station is merely used for redundancy. For instance, the third base station can always transmit the even bits. In the above example, wherein base station A is used for a three-way handoff, base station A transmits the even bits, while the existing base stations, B and C transmit the portion of bits that they were transmitting in the two-way handoff situation (odd and even bits, respectively). This is done so that less dynamic changes are needed to be made to the two channels already involved in the call.

In another embodiment, the portions transmitted are dynamically reassigned to all base stations upon entering a three-way handoff. In this embodiment, the ids are all compared with each other, and the base station with the lowest ID transmits one portion of bits while the other base stations transmit the other portion of bits. Thus, using base stations A,B, and C, again, the odd bits would be transmitted on base station A, while the even bits would be transmitted on base stations B and C.

When communication from one of the base stations is terminated, such that either the remote station exits soft-handoff altogether, or switches from a three-way handoff to a two-way handoff, the remote station needs to know how the bits are being transmitted on the remaining base stations.

In one embodiment, when the remote station exits soft-handoff, the existing base station simply transmits a standard rate encoded bit stream, which the remote station decodes.

In one embodiment, when the remote station goes from a three-way handoff to a two-way handoff, the base stations continue transmitting the portion of the encoded bit stream that they were transmitting before. In this embodiment, if they were both transmitting different portions of the lower encoded bit stream (e.g., one base station was transmitting odd bits and one was transmitting even bits), the remote station combines them into a lower rate encoded bit stream. If, however, they were both transmitting the same portion of the lower rate encoded bit stream (e.g., both base stations transmitting even bits), then the remote station just decodes each received bit stream as a standard rate encoded bit streams. In such a case, as long as the remote station remains in a two-way handoff, the bit streams received are handled as they are in a conventional system.

In another embodiment, the portions transmitted are dynamically reassigned to all base stations upon going from a three-way handoff to a two-way handoff. In this embodiment, the IDs are all compared with each other, and the base station with the lowest ID transmits one portion of bits while the other base stations transmit the other portion of bits. Using this embodiment allows the remote station in a two-way handoff to combine the two bit streams into a lower rate encoded bit stream regardless of whether the two base stations in question were transmitting the same bit streams while in a three-way handoff.

Remote station 38 can also use the method of the present invention at the boundary of cell or in a difficult situation such as a fade even if it has not established communication links with multiple sectors. It is usually not desirable to use additional channels for all remote stations at all times because the additional channels consume code channels and cells can run out of code channels. This reduces the capacity of the communication system due to code limitations. Therefore, in one embodiment, additional code resources are allocated to remote stations that are using larger amounts of power due to poor channel conditions. In this way a cell can dynamically add and remove additional code channels for each remote station in order to maintain the code consumption and the power consumption in balance with each other.

Remote station 38, which is using much power because it is on the boundary of a cell, can use two channels 40, 42 transmitted from the same sector $S_1$ when desirable. Each channel 40, 42 can contain the same information bits encoded with a different code, thus decreasing the Eb/No required for remote station 38. One of these channels is the primary channel and one of these channels is the secondary channel.

When a remote station is not in handoff, such as is the case as diagrammed with remote station 38, a base station can use a fundamental channel and a supplemental channel to transmit a lower encoded rate to the remote station. In one embodiment, a methodology can be used such that one portion of bits from the lower encoded bit stream is always transmitted on the primary channel and another portion of bits is always transmitted on the supplemental channel (e.g., odd bits go to the primary channel, while even bits go to the supplemental channel). In another embodiment, the base station can send a message to the remote station informing it which portion of the lower encoded bit stream will be transmitted on the primary channel, and which will be transmitted on the supplemental channel. It will be understood by one skilled in the art that the invention is not limited to the above embodiments of methods of transmission, nor the examples given above. In particular, the example of odd bits and even bits has been used throughout this application for consistency. However, as described in reference to block 240 of FIG. 2, it is readily understood that other means of portioning the lower rate encoded bits can be used as well.

By decreasing the amount of power needed by remote stations that are consuming a high level of power at any given moment, the present embodiments serve to increase the number of users or the throughput that a telecommunications system can support at any given moment.

Figure 6:
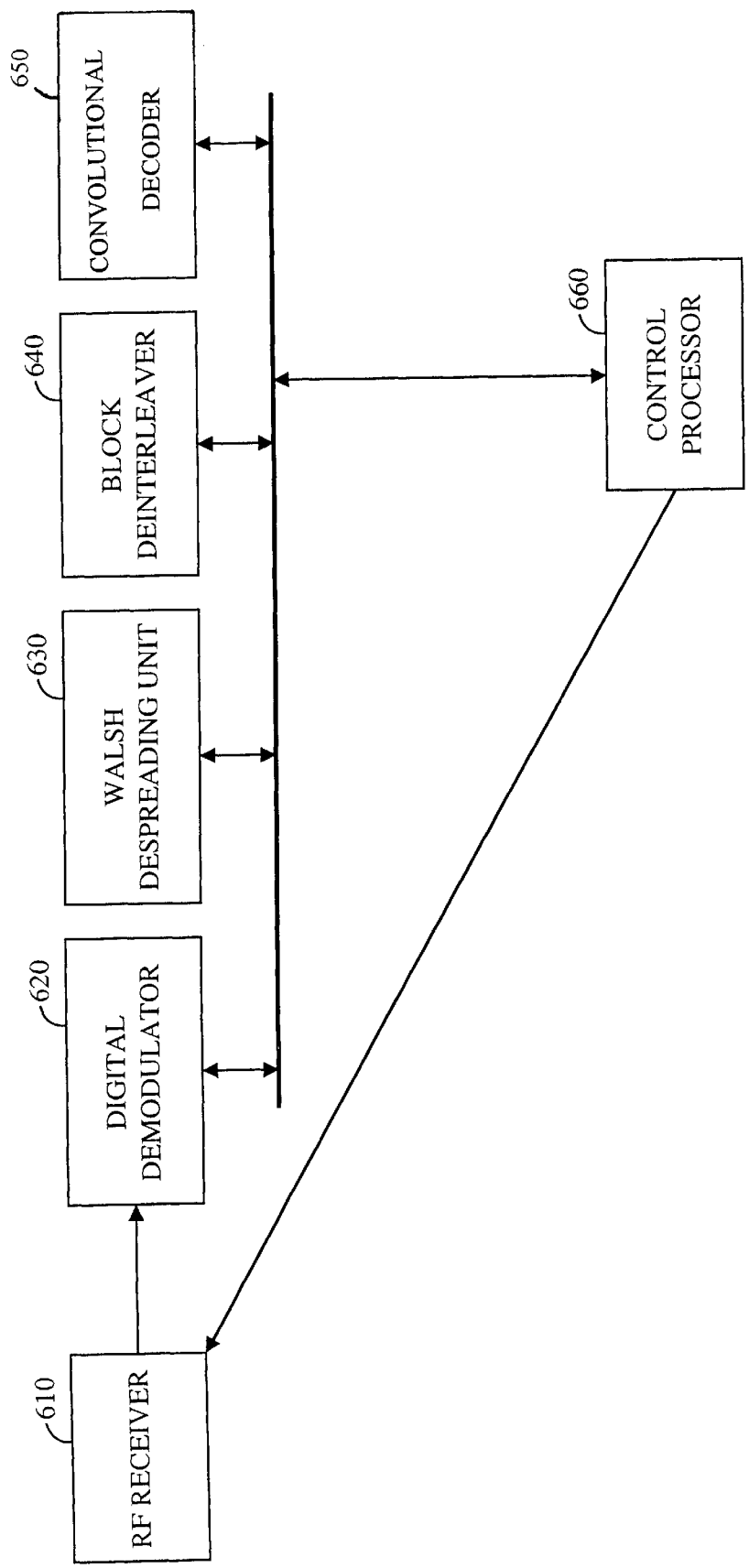
FIG 6 is a block diagram showing a simplified illustration of a remote station.

FIG. 6 is a block diagram showing a simplified illustration of a remote station. Digital demodulator 620, Walsh despreading unit 630, block deinterleaver 640, convolutional decoder 650, and control processor 660 are coupled via a digital bus, and RF receiver 610 is coupled to digital demodulator 620. In one embodiment, control processor 660 can activate RF receiver 610 and digital demodulator 620 to receive and process signals, and can deactivate them when in a power savings mode, such as a slotted-paging mode. Likewise, in one embodiment, control processor 660 can selectively activate and deactivate block deinterleaver 640 and convolutional decoder 650. The RF receiver 610 down-converts and digitizes RF signals, and provides the digitized signal to digital demodulator 620, which performs digital demodulation using PN despreading techniques, further described in reference to FIG. 7. The digitally demodulated data is passed to Walsh despreading unit 630, which performs Walsh despreading techniques, further described in reference to FIG. 7, and produces at least one bit stream output. For coded channels, such as traffic channels, the bit stream output is provided to block deinterleaver 640. In an embodiment that supports an uncoded auxiliary channel, such as a quick paging channel, which is an uncoded channel that uses on-off keying (OOK) modulated direct sequence spread spectrum, the bit stream output for the uncoded auxiliary channels is provided from Walsh despreading unit 630 to control processor 660 as an uncoded bit stream for further processing. In regard to coded channels, deinterleaver 640 deinterleaves the bit stream output provided by Walsh despreading unit 630, and provides a deinterleaved output stream to convolutional decoder 650. Convolutional decoder 650 uses convolutional decoding techniques known in the art, such as Viterbi decoding or Turbo decoding, to attempt to correct bit errors that occurred to the informational bit stream that was transmitted over a wireless environment. The convolutionally decoded bit stream is provided to control processor 660 for further processing.

In one embodiment, after receiving an indicator message, control processor 660 instructs digital demodulator 620 and Walsh despreading unit 630 to switch from a conventional mode of receiving data to a mode of the present embodiments in which data is received at a lower encoded rate across two channels. Likewise, control processor 660 can instruct digital demodulator 620 and Walsh despreading unit 630 to switch from a mode of the present embodiments back to a standard data reception mode after a predetermined time, or upon the receipt of another message from a base station instructing it to exit a mode of the present embodiments.

In one embodiment control processor 660 monitors the uncoded bit stream for indicator messages. In one embodiment control processor 660 monitors the convolutionally decoded bit stream for indicator messages.

One skilled in the art will recognize that control processor 660 may be implemented using field-programmable gate arrays (FPGA), programmable logic devices (PLD), digital signal processors (DSP), one or more microprocessors, application specific integrated circuit (ASIC) or other devices capable of performing the functions described above.

Figure 7:
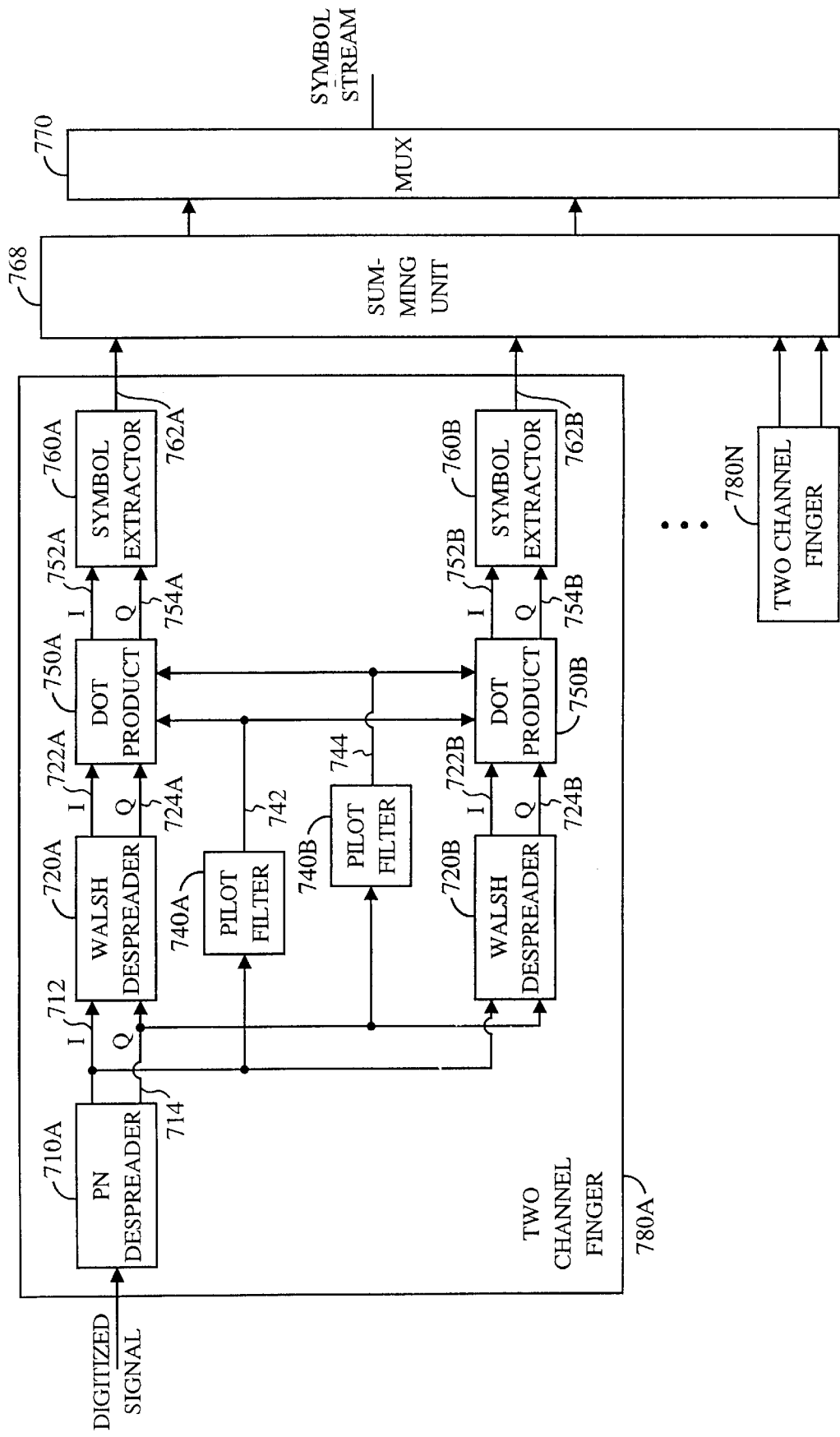
FIGS. 7 and 9 are block diagrams of a portion of a digital demodulator and a wash despreading unit that can be used to receive data in the received data detection mode of the present embodiments.

FIG. 7 is a block diagram of a portion of digital demodulator 620 and Walsh despreading unit 630 that can be used to receive data in a data reception mode of the present embodiments in which data is encoded using a lower rate of encoding and is transmitted in portions over a primary and secondary channel, wherein the transmissions of the primary and secondary channel originate from the same base station.

PN despreader 710 is a complex PN despreader which performs PN despreading, well known to one skilled in the art, on a digitized signal input (from RF receiver 610) and produces an in-phase (I) and a quadrature-phase (Q) component of the PN despread signal, each of which is provided to Walsh despreaders 720 and pilot filters 740 as input signals.

Walsh despreader 720a multiplies the I 712 and the Q 714 inputs by a first walsh code, which corresponds to the primary channel over which a first portion of a lower encoded rate bit stream was transmitted, and sums the despread signal over one Walsh symbol, thus producing as outputs Walsh despread I 722a and Walsh despread Q 724a. I 722a and Q 724a are provided as input to dot product 750a.

Walsh despreader 720b multiplies the I 712 and the Q 714 inputs by a first Walsh code, which corresponds to the primary channel over which a first portion of a lower encoded rate bit stream was transmitted, and sums the despread signal over one Walsh symbol, thus producing as outputs Walsh despread I 722b and Walsh despread Q 724b. I 722b and Q 724b are provided as input to dot product 750b.

In one embodiment, pilot filters 740 are low pass filters that are used to remove some of the noise from the received signal. In alternate embodiments, pilot filters 740 consist of a Walsh despreader, similar to Walsh despreader 720a but that despreads with a different Walsh code, immediately followed by a low pass filter. As would be evident to one skilled in the art, I 742 and Q 744 are essentially smoothed-over estimates of the pilot signal. It would also be evident to one skilled in the art that the pilot signal could consist of a few bits occasionally inserted in either or both data streams, and extracted at the output of Walsh despreaders 720a and 720b.

Figure 8:
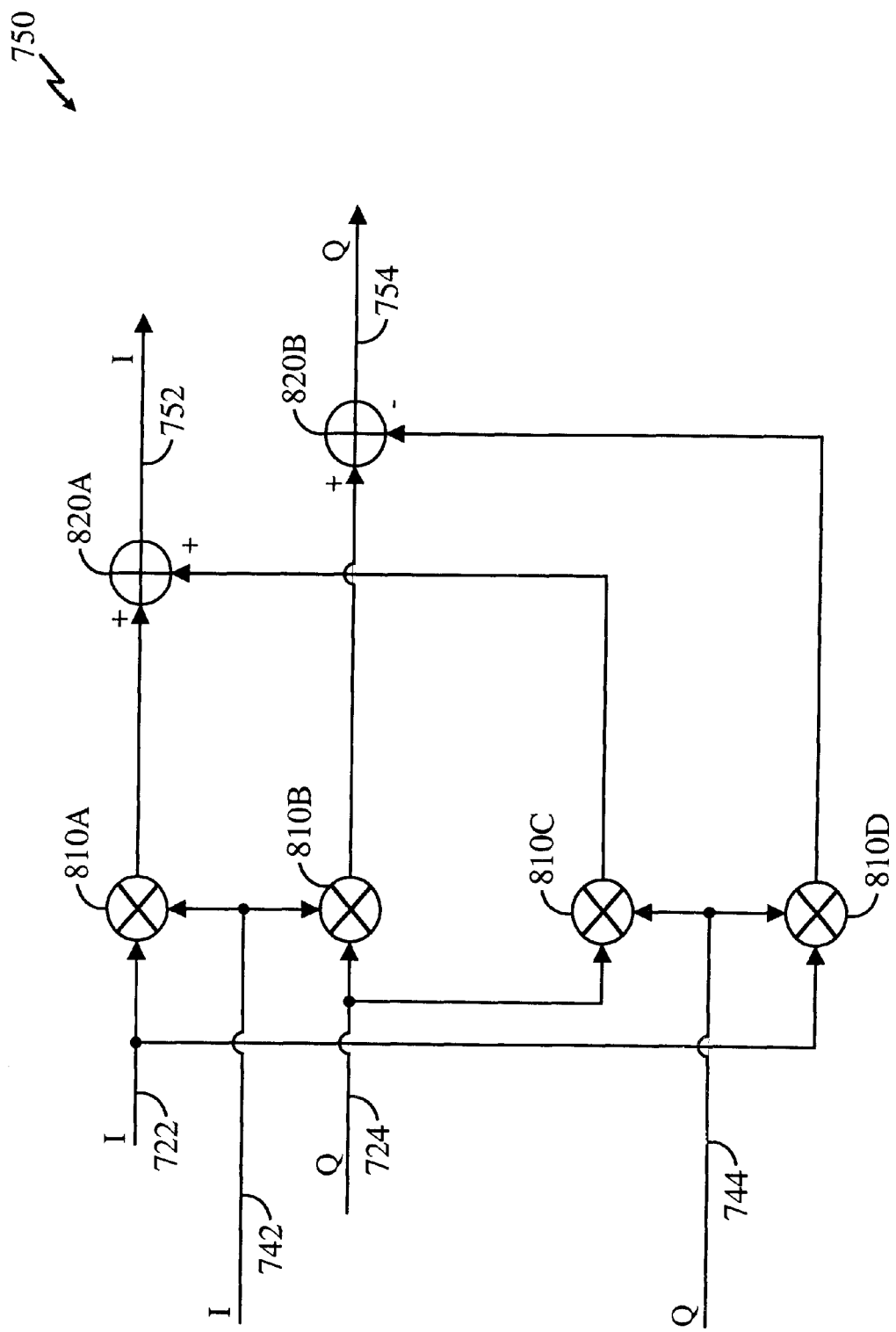
FIG. 8 is an exemplary embodiment of a dot product.

Dot products 750 function as what is known in the art as a conjugate complex product with the output of the pilot filter. Dot products 750 produce I and Q signal outputs that are estimates of the I and Q values transmitted on the data channels. Such dot product apparatus are known to those skilled in the art. An exemplary embodiment of a dot product apparatus is illustrated in FIG. 8.

The outputs of dot product 750a, namely I 752a and Q 754a, are the I and Q components of the primary channel, and are provided to symbol extractor 760a. This will be called the primary symbol extractor, because it extracts the symbols corresponding to the primary channel. The outputs of dot product 750b, namely I 752b and Q 754b, are the I and Q components of the secondary channel, and are provided to symbol extractor 760b. This will be called the secondary symbol extractor, because it extracts the symbols corresponding to the secondary channel.

Each symbol extractor 760 yields a series of symbols 762 based upon the type of modulation used. In an exemplary embodiment in which the data was transmitted using QPSK modulation techniques, symbol extractor 760 yields two symbols 762 for each pair of I and Q inputs 752 and 754. In another exemplary embodiment in which the data was transmitted using Binary Phase Shift Keying (BPSK) modulation techniques, symbol extractor 760 yields one symbol 762 for each pair of I and Q inputs 752 and 754. Symbol extractor 760 provides these symbols to summing unit 768. One skilled in the art will understand that in alternate embodiments that use other modulation techniques, symbol extractor 760 may be absent, in which case complex I and Q signals 752 and 754 could be directly supplied to summing unit 768, or directly supplied to MUX 770 (in an embodiment in which summing unit 768 is also absent).

Two-channel finger 780a is representative of a two-channel finger that is used to track two channels (a primary and a secondary) from a single transmission signal generated by a single base station. Each two-channel finger 780 produces a primary and a secondary channel output. In an embodiment in which symbol extractors are present, the primary channel output of a two-channel finger 780 is the output of the primary symbol extractor (e.g., 762a in FIG. 7), while the secondary channel output is the output of the secondary symbol extractor (e.g., 762b in FIG. 7). In an alternate embodiment in which symbol extractors are not present, the primary channel output is the primary I and Q values (e.g., 752a and 754a), while the secondary channel output is the secondary I and Q values (e.g., 752b and 754b).

To account for multi-path signals that can occur, the outputs from a plurality of two-channel fingers 780, each of which tracks the received signals at a slightly different PN offset or time delay, are supplied to summing unit 768. Summing unit 768 sums the primary channel output produced by each two-channel finger 780, and provides it to MUX 770. Additionally, summing unit 768 sums the secondary channel output produced by each two-channel finger 780, and provides the summed value to MUX 770. As is known to one skilled in the art, a summer is used to combine the output of multiple fingers in order to generate a better estimate of the transmitted I and Q or symbol values. In some embodiments, summing unit 768 may also rescale the signals in order to keep the signal within an acceptable dynamic range. The combined estimate need not be generated prior to MUX 770, but can rather be generated after MUX 770 in alternate embodiments. In an alternate embodiment, summing unit 768 is not present prior to MUX 770, in which case the primary channel outputs and secondary channel outputs from each two-channel finger 780 are supplied directly to MUX 770.

In one embodiment, MUX 770 is a multiplexer that receives as input primary channel data and secondary channel data from summing unit 768, which MUX 770 arranges into a single symbol stream that is provided to block deinterleaver 640. The symbols are arranged in accordance with the method used to transmit the data over the two channels. For instance, in an exemplary embodiment in which the odd bits are transmitted on the primary channel and the even bits are transmitted on the secondary channel, MUX 770 arranges the symbols 762 such that the estimate of the first received symbol corresponding to the primary channel will be followed by the estimate of the first received symbol corresponding to the secondary channel. In such an embodiment, this process repeats, wherein another symbol is output corresponding to the primary channel, followed by another symbol corresponding to the secondary channel. The symbol stream yielded by MUX 770 is supplied to convolutional decoder 650, further described in reference to FIG. 6.

An exemplary embodiment of dot product 750 is diagrammed in FIG. 8. In FIG. 8, I 742 and I 722 are complex multiplied in complex multiplier 810a, while I 742 and Q 724 are complex multiplied in complex multiplier 810b. Likewise, Q 744 and Q 724 are complex multiplied in complex multiplier 810c, while Q 744 and I 722 are complex multiplied in complex multiplier 810d. The output of complex multiplier 810a is then summed with the output of complex multiplier 810c in combiner 820a, thus producing I 752. The output of complex multiplier 810d is subtracted from the output of complex multiplier 810b in combiner 820b, thus producing Q 754.

Figure 9:
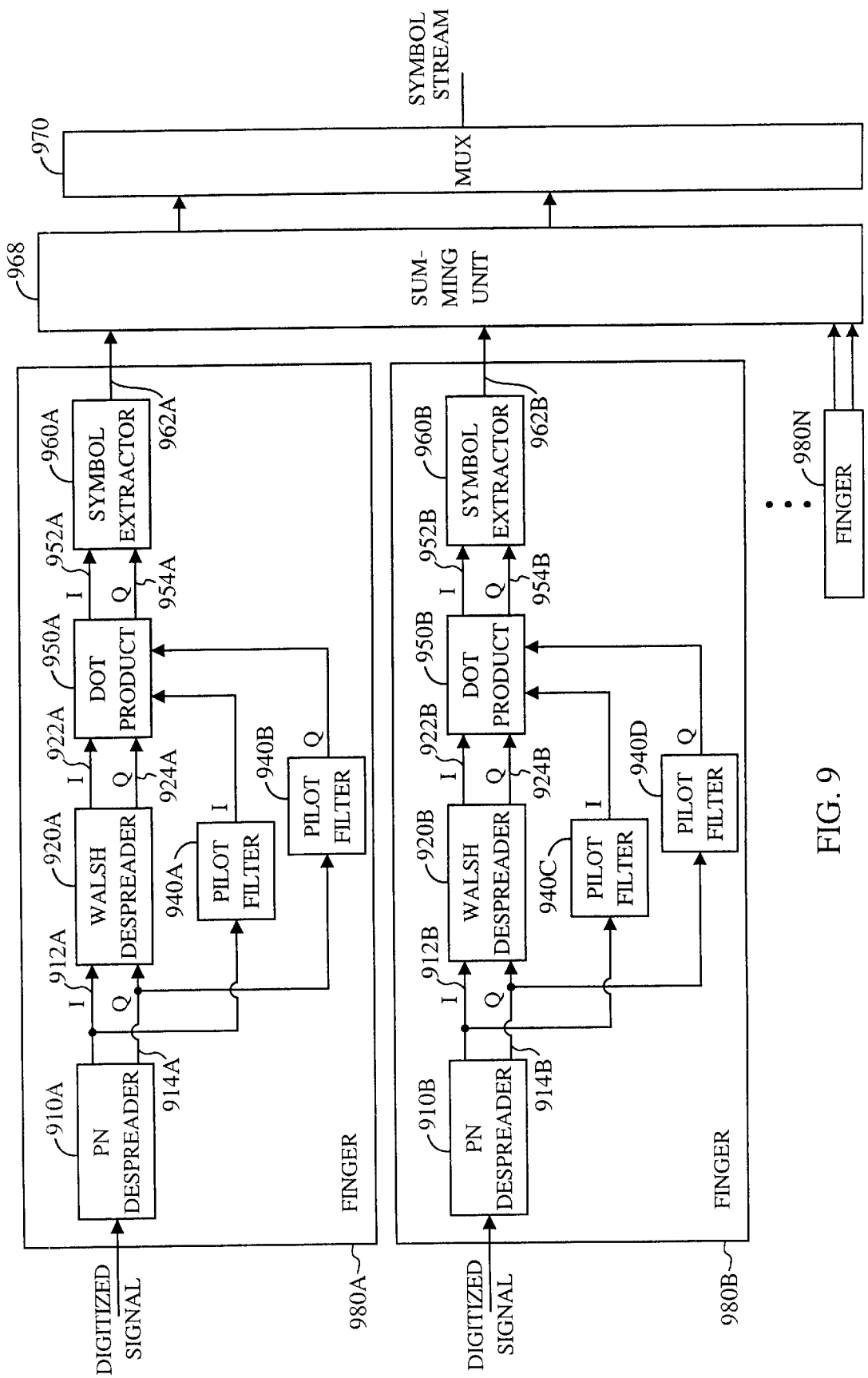

FIG. 9 is a block diagram of a portion of digital demodulator 620 and Walsh despreading unit 630 that can be used to receive data in a data reception mode of the present embodiments in which data is encoded using a lower rate of encoding and is transmitted in portions over a primary and secondary channel, wherein the transmissions of the primary and secondary channel originate from different base stations, or wherein the transmissions of the primary and secondary channel originate from the same base station (the latter provides an alternative to the apparatus described in reference to FIG. 7 in the case where the primary and secondary channel originate from the same base station).

PN despreader 910a is a complex PN despreader which performs PN despreading, well known to one skilled in the art, on a digitized signal input (from RF receiver 610)and produces an in-phase (I) and a quadrature-phase (Q) component of the PN despread signal, each of which are provided to Walsh despreaders 920 and pilot filters 940 as input signals. PN despreader 910a is used to decode a primary channel from a first base station.

PN despreader 910b is a complex despreader that functions like PN despreader 910b. PN despreader 910b behaves differently in that it is used to decode a secondary channel from a second base station. In one embodiment PN despreader 910b uses the same PN code for despreading as PN despreader 910a, but at any given time PN despreader 910b decodes with a different portion of the PN code than does 910a. In such an embodiment, the portion of the PN code used by each decoder for decoding at any given moment is determined by the PN offset associated with the base station it is decoding a channel from. As the PN offset for the first base station is different from the PN offset of the second base station in such an embodiment, the two PN despreaders 910 decode the received signal using different portions of the PN code at any given moment. In an alternate embodiment, PN despreader 910a uses a different PN code for despreading the received signal than does PN despreader 910b. In another alternate embodiment, for use in the case in which the primary and secondary channel transmissions originate from the same base station, one primary channel PN despreader 910a and one secondary channel PN despreader 910b use the same PN code and the same PN offset to decode the transmission; this can be used in lieu of a single two-channel finger 780a, described in reference to FIG. 7.

Walsh despreader 920a multiplies the I 912a and the Q 914a inputs by a first walsh code, which corresponds to the primary channel over which a first portion of a lower encoded rate bit stream was transmitted, and sums the despread signal over one Walsh symbol, thus producing as outputs Walsh despread I 922a and Walsh despread Q 924a. I 922a and Q 924a are provided as input to dot product 950a.

Walsh despreader 920b multiplies the I 912b and the Q 914b inputs by a second walsh code, which corresponds to the secondary channel over which a second portion of a lower encoded rate bit stream was transmitted, and sums the despread signal over one Walsh symbol, thus producing as outputs Walsh despread I 922b and Walsh despread Q 924b. I 922b and Q 924b are provided as input to dot product 950b.

In one embodiment, pilot filters 940 are low pass filters that are used to remove some of the noise from the received signal. In alternate embodiments, pilot filters 940 consist of a Walsh despreader, similar to Walsh despreader 920a but despreading a different Walsh code, immediately followed by a low pass filter. As would be evident to one skilled in the art, I 942a and Q 944a are essentially smoothed-over estimates of the pilot signal of the first base station. It would also be evident to one skilled in the art that the pilot signal of the first base station could consist of a few bits occasionally inserted in either or both data streams, and extracted at the output of Walsh despreaders 920a. Likewise, as would be evident to one skilled in the art, I 942b and Q 944b are essentially smoothed-over estimates of the pilot signal of the second base station. It would also be evident to one skilled in the art that the pilot signal of the second base station could consist of a few bits occasionally inserted in either or both data streams, and extracted at the output of Walsh despreaders 920b.

Dot products 950 function as what is known in the art as a conjugate complex product with the output of the pilot filter. Dot products 950 produce I and Q signal outputs that are 750 estimates of the I and Q values transmitted on the data channels. Such dot product apparatus are known to those skilled in the art. An exemplary embodiment of a dot product apparatus is illustrated in FIG. 8.

The outputs of dot product 950a, namely I 952a and Q 954a, are the I and Q components of the primary channel, and are provided to symbol extractor 960a. This will be called the primary symbol extractor, because it extracts the symbols corresponding to the primary channel. The outputs of dot product 950b, namely I 952b and Q 954b, are the I and Q components of the secondary channel, and are provided to symbol extractor 960b. This will be called the secondary symbol extractor, because it extracts the symbols corresponding to the secondary channel.

Each symbol extractor 960 yields a series of symbols 962 based upon the type of modulation used. In an exemplary embodiment in which the data was transmitted using QPSK modulation techniques, symbol extractor 960 yields two symbols 962 for each pair of I and Q inputs 952 and 954. In another exemplary embodiment in which the data was transmitted using Binary Phase Shift Keying (BPSK) modulation techniques, symbol extractor 960 yields one symbol 962 for each pair of I and Q inputs 952 and 954. Symbol extractor 960 provides these symbols to summing unit 968. One skilled in the art will understand that in alternate embodiments that use other modulation techniques, symbol extractor 960 may be absent, in which case complex I and Q signals 952 would be directly supplied to summing unit 968, or directly supplied to MUX 970 (in an embodiment in which summing unit 968 is also absent).

Finger 980a is representative of a finger that is used to track a single channel (a primary one) from a single transmission signal generated by a single base station. Each finger 980 tracks either a primary channel or a secondary channel and produces a primary or a secondary channel output accordingly. For instance, finger 980a tracks a primary channel and therefore produces a primary channel output, while finger 980b tracks a secondary channel and therefore produces a secondary channel output. In an embodiment in which symbol extractors are present, the primary channel output of a finger 980 that tracks a primary channel is the output of the primary symbol extractor (e.g., 962a in FIG. 9), while the secondary channel output of a finger 980 that tracks a secondary channel is the output of the secondary symbol extractor (e.g., 962b in FIG. 9). In an alternate embodiment in which symbol extractors are not present, the primary channel output is the primary I and Q values (e.g., 952a and 954a), while the secondary channel output is the secondary I and Q values (e.g., 952b and 954b).

To account for multi-path signals that can occur, the outputs from a plurality of fingers 980, each which track a primary or secondary received signals at a slightly different PN offset or time delay, are supplied to summing unit 968. Summing unit 968 sums the primary channel output produced by each primary channel finger 980, and provides it to MUX 970. Additionally, summing unit 968 sums the secondary channel output produced by each secondary channel finger 980, and provides the summed value to MUX 770. As is known to one skilled in the art, a summer is used to sum the output of multiple fingers in order to generate a better estimate of the transmitted I and Q symbol values. In some embodiments, summing unit 968 may also rescale the signals in order to keep the signal within an acceptable dynamic range. The combined estimate need not be generated prior to MUX 970, but can rather be generated after MUX 970 in alternate embodiments. In an alternate embodiment, summing unit 968 is not present prior to MUX 970, in which case the primary channel outputs and secondary channel outputs from each primary channel finger 980 and secondary finger 980, respectively, are supplied directly to MUX 970.

In one embodiment, MUX 970 is a multiplexer that receives as input primary channel data and secondary channel data from summing unit 968, which MUX 970 arranges into a single symbol stream that is provided to block deinterleaver 640. The symbols are arranged in accordance with the method used to transmit the data over the two channels. For instance, in an exemplary embodiment in which the odd bits are transmitted on the primary channel and the even bits are transmitted on the secondary channel, MUX 970 arranges the symbols 962 such that the estimate of the first received symbol corresponding to the primary channel will be followed by the estimate of the first received symbol corresponding to the secondary channel. In such an embodiment, this process repeats, wherein another symbol is output corresponding to the primary channel, followed by another symbol corresponding to the secondary channel. The symbol stream yielded by MUX 970 is supplied to convolutional decoder 650, further described in reference to FIG. 6.

The group of modules located in each box 980 is representative of a finger used to track a signal from a signal base station, without taking into account multi-path signals that might be received from each base station as well. Although, for the sake of simplicity, multiple fingers used to track multipath signals is are shown in FIG. 9, one skilled in the art will understand that to account for a multi-path environment more fingers 980 with different PN offsets can be added to track multiple multi-path signals from one or more base stations in a multi-path environment.

The previous description of the embodiments is provided to enable a person skilled in the art to make or use the present invention. The various modifications to these embodiments will be readily apparent to those skilled in the art, and the generic principles defined herein may be applied to other embodiments without the use of the inventive faculty. Additionally, the various methods taught herein can be combined with each other in any manner without the use of the inventive faculty Thus, the present invention is not intended to be limited to the embodiments shown herein but is to be accorded the widest scope consistent with the principles and novel features disclosed.

What is claimed is:

1. A method for improving the transmission of information signals in a communications system, comprising:
   determining whether the communications system would benefit transmitting an information signal over at least two transmission links;
   if the communications system would benefit from transmitting the information signal over the at least two transmission links, then:
     encoding the information signal to provide an encoded information signal;
     forming at least a first transmission signal and a second transmission signal, each having bits selected from the encoded information signal; and
     transmitting each of the at least first and second transmission signals over a respective one of the at least two transmission links; but
   if the communications system would not benefit from transmitting the information signal over the at least two transmission links, than:
     encoding the information signal to provide an encoded information signal; and
     transmitting the encoded information signal over a single transmission link.

2. The method of claim 1, wherein the at least two transmission links are formed between a remote station and a single base station.

3. The method of claim 2, wherein the at least two transmission links are established over separate transmission channels.

4. The method of claim 1, wherein the at least two transmission links are formed between a remote station and a plurality of base stations.

5. The method of claim 4, wherein the first and second transmission signals are mixed with a single Walsh code.

6. The method of claim 4, wherein the transmission signal of each of the at least two transmission links are mixed with the same Walsh code.

7. The method of claim 4, wherein the remote station is in soft handoff between at least two of the plurality of base stations.

8. The method of claim 2, wherein the remote station is in softer handoff within the single base station.

9. The method of claim 1, wherein determining whether the communications system would benefit from transmitting the information signal over the at least two transmission links comprises determining if a transmit power value of the information signal is above a predetermined level.

10. The method of claim 9, wherein determining whether the communications system would benefit from transmitting the information signal over the at least two transmission links further comprises determining whether a number of available spreading codes is above a second predetermined level.

11. The method of claim 1, wherein encoding the information signal to provide an encoded information signal comprises encoding the information signal using a rate R=1/n code, wherein n is an integer value indicating a number of output bits.

12. The method of claim 11, wherein forming the at least first transmission signal and second transmission signal comprises assigning alternating bits of the encoded information signal to the first transmission signal and second transmission signal.

13. A system for improving the transmission of information signals in a communications system, comprising:

means for determining whether the communications system would benefit from transmitting an information signal over at least two transmission links;

means for encoding the information signal to provide an encoded information signal;

means for forming at least a first transmission signal and second transmission signal from the encoded information signal in response to the means for determining whether the communications system would benefit from transmitting the information signal over the at least two transmission links; and means for transmitting each of the first and second transmission signals over the at least two transmission links, wherein the means for transmitting is further configured for alternatively transmitting the encoded information signal over a single transmission link in response to the means for determining.

* * * * *